INVENTORS:
THOMAS H. LEE,
WALTER R. WILSON,
BY William Freedman
ATTORNEY

INVENTORS:
THOMAS H. LEE,
WALTER R. WILSON,

BY *William Freedman*

ATTORNEY

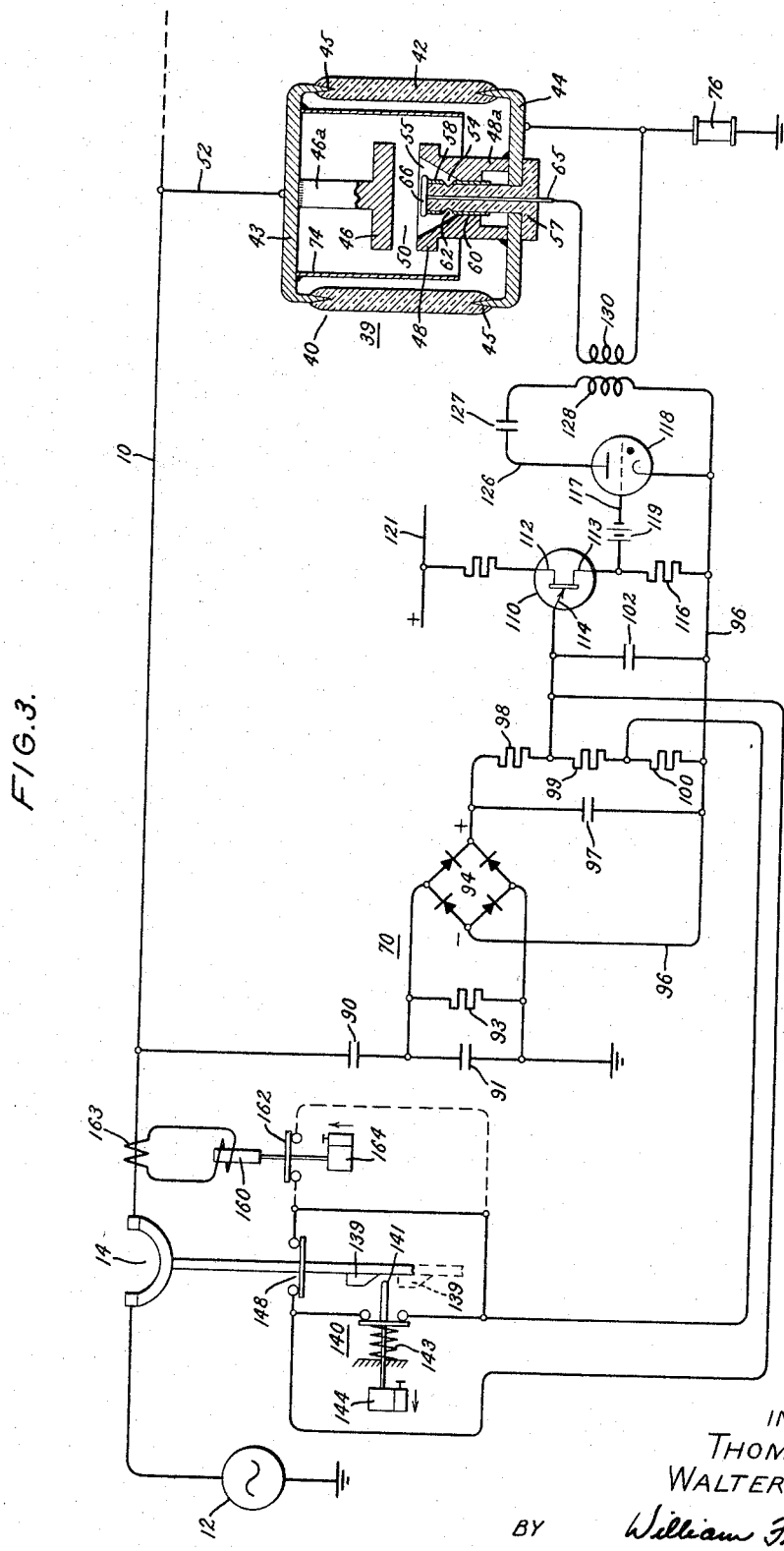

United States Patent Office 3,339,112
Patented Aug. 29, 1967

3,339,112
VOLTAGE LIMITING PROTECTIVE ARRANGEMENT FOR HIGH VOLTAGE POWER CIRCUITS
Thomas H. Lee, Media, and Walter R. Wilson, Wallingford, Pa., assignors to General Electric Company, a corporation of New York
Filed Jan. 28, 1965, Ser. No. 428,746
10 Claims. (Cl. 317—17)

This invention relates to a protective arrangement for limiting the peak voltage developed by a switching surge on a high voltage electrical power system and relates more particularly to a protective arrangement that can limit this peak voltage to a relatively low value in the range of 1.5 to 2 times the normal line-to-ground peak voltage of the system.

As the operating voltages being proposed for high voltage electric power systems are increasing to higher and higher levels, it is becoming increasingly evident that the peak voltage produced by switching surges in such systems should be limited to values that are relatively small multiples of the normal peak voltage of the system. For example, in C.I.G.R.E. paper 412 by Sporn et al. presented in June 1964, it is stated that satisfactory operation of a 1000 kilovolt transmission line with 45 insulators in a 45 foot tower window will require that switching surges be limited to a value of about 1.5 or 1.6 times normal voltage. By way of contrast, in a typical 345 kilovolt circuit, switching surges are typically allowed to reach 2.5 times normal system voltage.

The usual approach to limiting the peak value of switching surges involves providing the circuit breakers of the system with highly refined surge-control features that enable them to open and close under all conditions without developing peak surge voltages exceeding the selected maximum. Examples of such features are the use of low ohmic resistors shunting the contacts of the circuit breaker, preinsertion of such resistors during a closing operation, and precise timing of the opening and closing of the circuit breaker poles. A disadvantage of this approach is that such surge-control features can be included in the circuit breaker only at great expense; and, moreover, for certain application, the presence of even these features does not always reduce the peak surge voltages to values as low as might be desired.

Another possible approach to this problem is to use conventional lightning arrestors with an appropriate sparkover voltage for limiting the peak switching surge voltage developed. But one of the problems presented by this approach is that a conventional arrestor with a low sparkover voltage (e.g., less than about two times normal peak voltage) cannot be relied upon to consistently interrupt the circuit therethrough after the long duration discharge currents that would typically follow a sparkover caused by a switching surge in a high voltage system. Because of its low initial sparkover voltage and its limited energy dissipation capability, such an arrestor would be susceptible to breakdown by the usual recovery voltage transient which builds up after a natural current zero and to related damage.

An object of our invention is to provide a protective arrangement that comprises a gap device that can sparkover to limit the peak voltages developed by switching surges to a predetermined low value in the range of 1.5 to 2 times normal peak voltage and, despite this low sparkover voltage, can still consistently interrupt without damage the currents that follow switching surge sparkovers.

In carrying out our invention in one form, we provide an electric circuit breaker that has a bus terminal and a line terminal. In combination with the circuit breaker, we provide a triggered vacuum gap device that comprises a high evacuated envelope evacuated to a pressure $10^{-5}$ mm. of mercury or less, a pair of spaced-apart main electrodes within said evacuated envelope defining a main vacuum gap therebetween, and means including a trigger gap within said evacuated envelope for injecting a concentration of charged conduction carriers into said main gap in response to sparkover of said trigger gap to produce a sparkover between said main electrodes. Means is also provided for electrically connecting said main electrodes in a bypass circuit extending electrically between said line terminal and ground. Triggering means is provided for causing a sparkover of said trigger gap and a resultant sparkover between said main electrodes when the voltage between said line terminal and ground reaches a predetermined value in the range of 1.5 to 2 times the normal line-to-ground peak voltage.

In a modified form of our invention, we provide a different triggering means, which is sensitive to the rate of change of voltage on the power line. This particular triggering means causes sparkover of said trigger gap and main gap in response to the rapidly-rising switching surge voltage even before it reaches normal line-to-ground peak voltage.

Another aspect of our invention relates to protecting a circuit breaker from a damaging internal breakdown during the brief period after a heavy current interruption when its internal dielectric strength is reduced. It sometimes happens that during this brief period of reduced dielectric strength, a high impulse voltage travels down the line to the open circuit breaker. If this high impulse voltage were to produce a breakdown inside the breaker that resulted in a power fault, then the usual circuit breaker would not be in a condition to interrupt fault current and would be susceptible to serious damage. This is explained in more detail in application S.N. 221,152—Wilson, filed Sept. 4, 1962, now Patent No. 3,168,681 and assigned to the assignee of the present invention. The application in that application is one of the joint applicants in the present application.

By using a triggered vacuum gap device with a sparkover voltage in the lower portion of the above-described range connected in a bypass circuit extending from the circuit breaker line terminal to ground, we can provide substantial protection against such an internal breakdown since the very low sparkover voltage of the gap device will permit the gap device to break down at a low enough voltage to prevent an internal breakdown of the circuit breaker. In cases where the triggered vacuum gap device does not have a low enough normal sparkover voltage to provide the desired protection during the reduced dielectric strength, we provide means for quickly lowering the effective value of the sparkover voltage when the circuit breaker opens. The triggered vacuum gap device is exceptionally well suited to such an adjustment in effective sparkover voltage because its design permits this adjustment to be made without moving massive parts or relying on other involved procedures, all of which tend to be unduly time consuming and not as precise as might be desired. With our triggered vacuum gap device, we are able to use a simple electrical circuit for effecting this reduction in sparkover voltage.

For a better understanding of our invention, reference may be had to the following description taken in conjunction with the accompanying drawings, wherein:

FIG. 3 is a schematic showing of another protective arrangement embodying a modified form of our invention.

Figure 1:
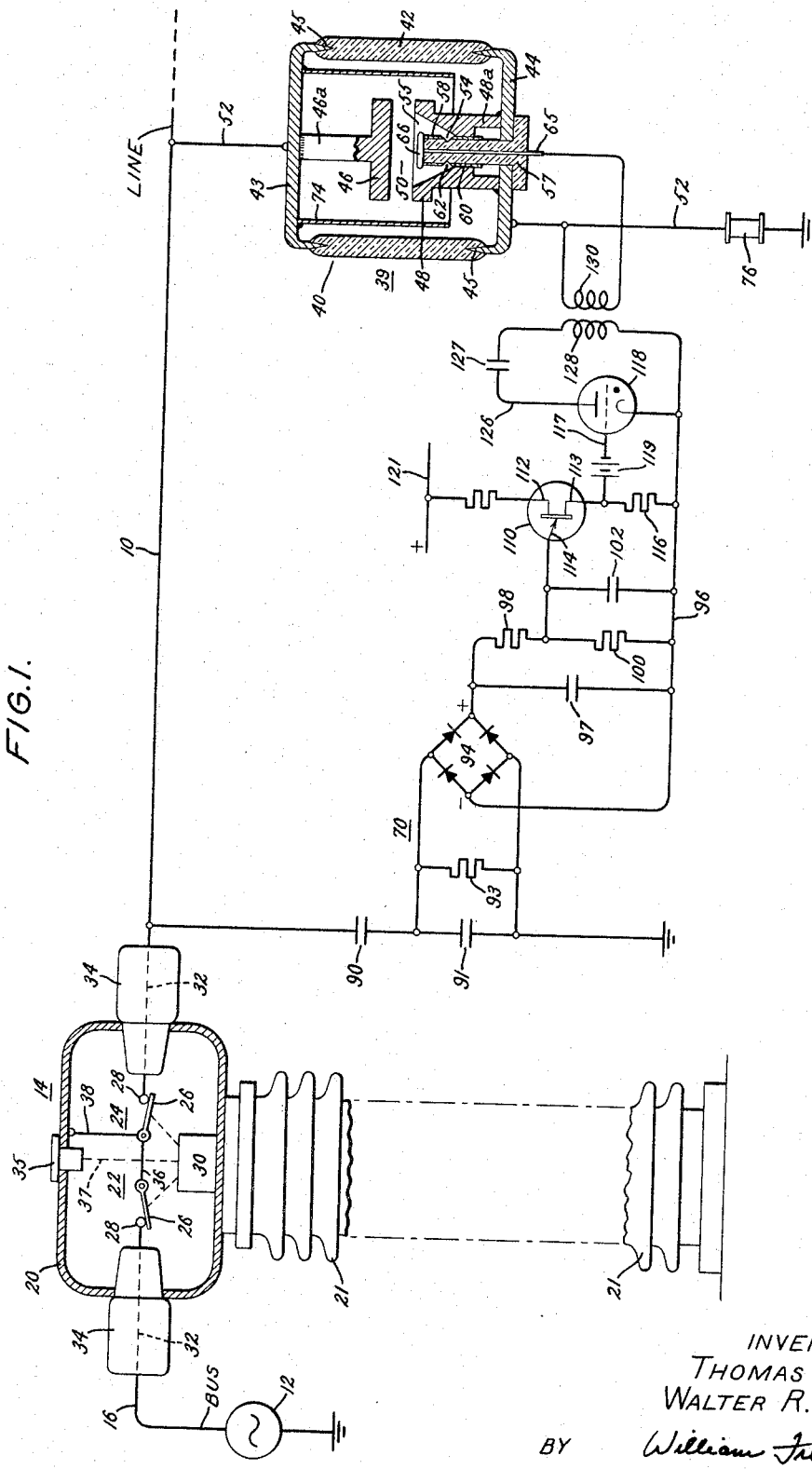
FIG. 1 is a schematic showing of a protective arrangement embodying one form of our invention.

Referring now to the schematic showing of FIG. 1, there is shown a high voltage transmission line 10 which transmits electric power from a suitable high voltage source 12 to a remote point. The source is connected to the line 10 through a high voltage circuit breaker schematically shown at 14. For convenience, the portion of the power circuit located between the source 12 and the breaker 14 will be referred to as the bus 16.

The circuit breaker 14 can be of any suitable conventional design but is preferably of the general type shown in Patent No. 3,133,176—Schneider, assigned to the assignee of the present invention. This circuit breaker comprises a metallic tank 20 which is normally at a high voltage and is isolated from ground by an insulating column 21 on which the tank 20 is mounted. Located within the tank 20 are two series-connected pairs 22 and 24 of separable contacts. Each pair of contacts comprises a movable contact 26 which can be separated from its mating stationary contact 28 by an operating mechanism 30 to initiate a circuit interrupting operation.

The stationary contact 28 of each pair of contacts is mounted on a rigid conductive stud 32 which extends through one end of the metallic tank 20. The two studs 32 project through opposite ends of the tank 20 and are supported on the tank by suitable porcelain shells 34 respectively surrounding the studs 32. When the circuit breaker is open, these porcelain shells electrically insulate the studs 32 from the metallic tank. A stud 32 and its surrounding porcelain shell 34 constitutes a conventional lead-in bushing.

The two pairs 22 and 24 of contacts are electrically connected in series by conductive structure 36 which is electrically connected to the tank 20 by a conductor 38. When the contacts are closed, the tank 20 is at line voltage by reason of this connection 38. When the contacts are open, the tank will preferably be at a mid potential with respect to the two lead-in conductors 32.

The tank 20 is normally filled with high pressure air, which is used for extinguishing the arcs drawn when the contacts are opened. A suitable normally-closed blast valve 35, coupled to the operating mechanism 30 by means schematically indicated at 37, is opened by the operating mechanism 30 when the contacts are separated, and this creates a blast of air through the arcing region that results in rapid arc-extinction. When the arcs are extinguished, the blast valve is closed (by suitable means, not shown). The contacts 26 can be held open to maintain the circuit open or can be rapidly reclosed if it is desired to effect rapid reclosing. A normal closing operation can be effected simply by returning the movable contacts 26 from their open to their closed position when it is desired to effect closing.

When the circuit breaker 14, or some other circuit breaker (not shown) connected to the line 10, is operated to open position or to closed position, certain transient overvoltages will be developed on the line 10. These transient overvoltages, we refer to as switching surges. As the operating voltages being proposed for high voltage and extra high voltage systems are increasing to higher and higher levels, it is becoming increasingly apparent that it will be necessary to limit the peak voltages produced by such switching surges to values that are relatively small multiples of the normal peak voltage of the system. For example, in certain extra high voltage circuit applications, it may be necessary to limit the peak line-to-ground voltages developed by switching surges to a maximum value in the range of 1.5 to 2 times normal peak line-to-ground voltage. This is a considerably lower maximum than the most stringent requirements now prevailing, which are that the peak line-to-ground voltages be limited to about 2.5 times normal peak line-to-ground voltage.

In the power system illustrated in FIG. 1, we limit the peak line-to-ground voltage developed by switching surges to the desired low value by providing a triggered vacuum gap device 39 on the line side of the circuit breaker 14. This triggered vacuum gap device 39 is preferably constructed as shown and claimed in U.S. Patent 3,087,092—Lafferty, assigned to the assignee of the present invention. Accordingly, it comprises a sealed envelope 40 that is evacuated to a pressure of $10^{-5}$ mm. of mercury or lower. The envelope 40 comprising a casing 42 of a suitable insulating material, such as a ceramic, and a pair of metallic end caps 43 and 44 joined in vacuum-tight relationship to the respective opposite ends of the insulating casing 42 by suitable seals 45.

Located within the evacuated envelope 40 is a pair of main electrodes 46 and 48 that are spaced apart to define a primary gap 50 therebetween. These electrodes 46 and 48 are preferably of a dish-shaped configuration. The upper electrode 46 is supported on the upper end cap 43 by means of a conductive supporting rod 46a, whereas the lower electrode 48 is supported on the lower end cap 44 by a tubular conductive supporting rod 48a.

The main electrodes 46 and 48 are connected in a bypass circuit 52 that extends between the high voltage line 10 and ground at the line terminal side of the circuit breaker 14. The primary vacuum gap 50 between the electodes 46 and 48 has a high dielectric strength which normally maintains this bypass circuit open.

It is to be understood that the circuit of FIG. 1 has a low enough voltage rating to permit a single gap to be relied upon to withstand normal line-to-ground voltages without a breakdown. For higher voltage circuits, an appropriate number of these gap devices will be connected in series in the bypass circuit 52, as will be described hereinafter in connection with FIG. 2.

For causing the main gap 50 to break down when the voltage to ground on the line 10 reaches a predetermined level, there is provided a trigger gap 54 located within a centrally-disposed recess 55 in the lower electrode 48. This trigger gap comprises a cylindrical ceramic support 57 located within the recess 55 and two thin layers 58 and 60 of metal bonded to the external surface of the ceramic support 57 in spaced-apart relationship along the length of the support. These two layers of metal constitute the electrodes of the trigger gap. They are separated by a V-shaped groove 62 that extends about the circumference of the ceramic support and has its walls defined by the ceramic material itself. One of the trigger electrodes 60 is electrically connected to the main electrode 48. The other trigger electrode 56 is normally electrically isolated from the main electrode 48.

These layers 58 and 60 are formed of a metal such as titanium which is a good getter for active gases such as hydrogen and which is capable of absorbing a large quantity thereof. In a preferred form of our invention, each of these two layers of titanium is charged with a large quantity of hydrogen in the manner explained in the aforementioned Lafferty patent.

As is well known, the lines of field distribution at the interface between a metal and a ceramic body in intimate contact are highly favorable to a breakdown at such an interface. Accordingly, a relatively low voltage appearing across the trigger gap can initiate a discharge from one of these interfaces across the trigger gap.

For applying voltage across the trigger gap, a conducting lead 65 is provided extending through a central passageway in the ceramic support 57. At its inner end, this lead 65 is brazed to a metallic cap 66 which is in electrical contact with the trigger electrode 58. The metal cap 66 is hermetically sealed to the inner end of the ceramic support 57 by conventional ceramic-to-metal sealing techniques.

For applying a triggering pulse to the trigger gap 54 when the line-to-ground voltage exceeds a predetermined value, we provide a voltage sensitive triggering circuit 70. The input for this triggering circuit 70 is derived from a circuit that comprises the series combination of a pair of voltage dividing capacitors 90 and 91 connected between the line 10 and ground. The capacitance of capacitor 91 is large compared to that of capacitor 90 so that a relatively low voltage appears across capacitor 91. This voltage produces a small flow of current through a high ohmic resistor 93 connected across the terminals of capacitor 91. The voltage developed across the resistor 93 is rectified by a full wave rectifier 94 having its output terminals 95 and 96 connected across a smoothing capacitor 97. The voltage appearing across smoothing capacitor 97 is a smoothed unidirectional signal voltage having an amplitude substantially proportional to the voltage between line 10 and ground.

This unidirectional signal voltage is applied to the series combination of two resistors 98 and 100. The portion of this voltage appearing across the resistor 100 is applied to the terminals of a capacitor 102. Thus, the voltage across capacitor 102 is also proportional to the voltage between the line 10 and ground.

For firing the triggered vacuum gap device 39 when the voltage across capacitor 102 reaches a predetermined level, a level detector 110 in the form of a silicon unijunction transistor is provided. This unijunction transistor 110 is of a conventional form, such as disclosed and claimed in U.S. Patent No. 2,769,926—Lesk, assigned to the assignee of the present invention, and it will therefore be explained only in sufficient detail to provide an understanding of the present invention. Referring now to the unijunction transistor 110, 112 and 113 represent the two bases of the transistor, and 114 represents the emitter of the transistor. The two bases 112 and 113 are connected across a source of voltage comprising a positive bus 121 and the negative conductor 96 between which a constant voltage is maintained. The details of this source are unimportant to the present invention and therefore are not shown in the drawing. So long as the voltage between the emitter 114 and the lower base 113 is below a certain critical value, called the peak point emitter voltage, a very high resistance is present between the emitter and the two bases, and therefore no significant amount of current flows in the circuit of emitter 114. However, when the emitter voltage is increased to this critical peak point emitter voltage, the transistor 110 fires, i.e., the resistance between its emitter 114 and base 113 suddenly drops, allowing greatly increased current to flow from the emitter 114 through the base 113. This greatly increased current is derived from the capacitor 102, which, in response to firing of the transistor 110, quickly discharges through the circuit including the emitter 114 and the base 113.

Connected in series circuit relationship with the lower base 113 is a resistor 116 across which a voltage is abruptly developed when current flows through the emitter-base circuit upon firing of the unijunction transistor 110. This voltage is applied to the control grid 117 of a hydrogen thyratron 118. This control grid 117 is appropriately biased by suitable biasing means schematically shown at 119. When the voltage that is abruptly developed across the resistor 116 upon firing of level detector 110 reaches a predetermined level, the hydrogen thyratron 118 fires in a well-known manner to complete a discharge circuit 126 for a previously-charged capacitor 127. Connected in this circuit 126 across the capacitor 127 is the primary winding 128 of a pulse transformer. The secondary winding 130 of this pulse transformer is connected across the trigger gap 54 of the triggered vacuum gap device 39. When the capacitor 127 discharges in response to firing of the hydrogen thyratron 118, a voltage pulse is developed by the transformer across the trigger gap 54. This causes a breakdown, first, of the trigger gap and then the main gap 50, as will soon be described.

When normal voltage is present on the line 10, the voltage across the capacitor 102 is insufficient to fire the level detector 110 and hence is insufficient to produce a sparkover of the trigger gap 54. But should the line-to-ground voltage on the line 10 rise to a predetermined value in the range of 1.5 to 2 times normal peak line-to-ground voltage, then sufficient voltage will be developed across the capacitor 102, to cause the trigger circuit 70 to produce a sparkover of the trigger gap 54.

An arc is established across the trigger gap 54 by this sparkover; and this arc immediately heats the titanium layers 58 and 60 of the trigger gap to cause the evolution of a quantity of hydrogen gas from the hydrogen-charged layers of titanium. This hydrogen gas is ionized by the arc and the ionized hydrogen is rapidly propagated, or injected, into the main gap 50, thus drastically reducing its dielectric strength and causing it to break down in response to the voltage then prevailing between the main electrodes 46 and 48. The ionized hydrogen particles are referred to hereinafter as charged conduction carriers.

Main electrodes 46 and 48 are made of a nonrefractory metal, such as copper, that is substantially free of all gaseous impurities and impurities which, upon decomposition, will produce gases. Accordingly, the arc that is established between the main electrodes evolves no appreciable quantity of noncondensable gases from the main electrodes. This greatly aids the main gap in recovering its dielectric strength immediately after a current zero is reached.

The arc across the main gap 50 does vaporize metal from the main electrodes, but these are metallic vapors and can readily be condensed. For this purpose, a tubular metallic shield 74 is provided about the main gap 50 to intercept and condense the arc-generated metallic vapors as they are projected radially outward from the gap 50. This condensation of these metallic vapors occurs very rapidly, and this permits the gap to build up its dielectric strength at a very high rate when the current zero point is reached.

The small amount of hydrogen gas which is evolved from the trigger gap is either rapidly reabsorbed by the titanium layers 58, 60 or is gettered by the electrode vapors from the main gap as they condense on the shield 74. Accordingly, no significant amount of this gas is present to interfere with rapid recovery of dielectric strength across the main gap 50 when the current zero point is reached.

When the current zero point is reached at the end of a half cycle of arcing current, dielectric strength can be built up across the main gap 50 at such a high rate that the breakdown, or sparkover, voltage on the next half cycle of current is again determined by the trigger gap rather than the main gap. Accordingly, when the current zero point is reached, the current through the gap is permanently interrupted unless the voltage then developed on the line 10 is high enough to develop across capacitor 72 a voltage as high as the original voltage for which the level detector 110 was set. In case of this latter contingency, the level detector will fire and thus cause the trigger gap 54 to produce another breakdown of the main gap; and another half cycle of current will be permitted to pass through the gap device. At the current zero following this additional half cycle of current, the circuit is permanently interrupted, assuming the voltage then appearing on the line 10 is then insufficient to develop a voltage across capacitor 102 as high as the original voltage for which the level detector 110 was set. Ordinarily, at the current zero immediately following the first half cycle of arcing current, the voltage developed on the line 10 will be insufficient to produce another breakdown of the gap device and the circuit through the gap device will be permanently interrupted.

It is to be understood that the capacitor 127 is provided with a suitable charging circuit (not shown) that is capable of restoring its charge within several milliseconds after it has discharged to create the above-described firing pulse. Thus, the capacitor 127 is in readiness to create another pulse within a half-cycle of power frequency voltage after its prior pulse in the event that the trigger circuit 70 is called upon for closely successive operations of the trigger gap 54.

A triggered vacuum gap device constructed as illustrated is capable of consistently interrupting many thousands of amperes; but to prolong its life and to reduce system shock, it is desirable that the current flowing therethrough be limited by a resistor such as shown in 76, connected in the circuit 52 between the gap device 39 and ground. This resistor 76 is preferably a non-linear resistor made of a material having a negative resistance-current characteristic, such as the material sold by General Electric Company under the trademark Thyrite.

The triggered vacuum gap device 39 of FIG. 1 is not only capable of limiting voltages developed by switching surges but can also limit peak voltages developed on the system by lightning surges. Should lightning strike the line 10, it would produce a sharp rise in line-to-ground voltage. A predetermined portion of this voltage would appear across capacitor 102, immediately causing a sparkover of the trigger gap and a resulting arc-over of the main gap. This arc-over would establish a low resistance path to ground through the by-pass circuit 52 for the high magnitude lightning current. Under these high current conditions, the nonlinear resistor 76 would have a low effective resistance due to its negative resistance-current characteristic, and thus the voltage developed thereacross by the high current flowing therethrough would be held to an acceptable level. After a high magnitude lightning current has passed through the bypass circuit 52, a much lower follow current from the system flows therethrough. Under these conditions, the nonlinear resistor 76 has a relatively high resistance and can limit this current to a modest value that the triggered vacuum gap device 39 can easily interrupt at the first current zero following passage of the line current.

Because the vacuum gap device 39 has the capacity for interrupting many thousands of amperes of current and has an exceptionally high energy dissipating ability, the non-linear resistor 76 can be relatively small. The use of a resistor that is small is particularly advantageous when lightning currents flow therethrough because it more readily limits the voltage developed thereacross by the high lightning current.

It is important that the bypass circuit 52 with its gap device or devices 39 be located on the line terminal side of the circuit breaker 14 because in this location it is capable of protecting the circuit breaker and apparatus on the side of the circuit breaker from voltage surges, e.g., lightning surges, traveling down the line 10. If the location of the bypass circuit 52 was on the bus side of the circuit breaker instead of the line side, the bypass circuit would be unable to protect the circuit breaker from such voltage surges when the circuit breaker was open.

For most high voltage circuits that we are concerned with, a single vacuum gap device does not have enough dielectric strength to permit it to be relied upon for withstanding normal line-to-ground voltages. It ordinarily will be necessary to use a plurality of these gap devices connected in series in order to withstand the high voltages involved.

Figure 2:
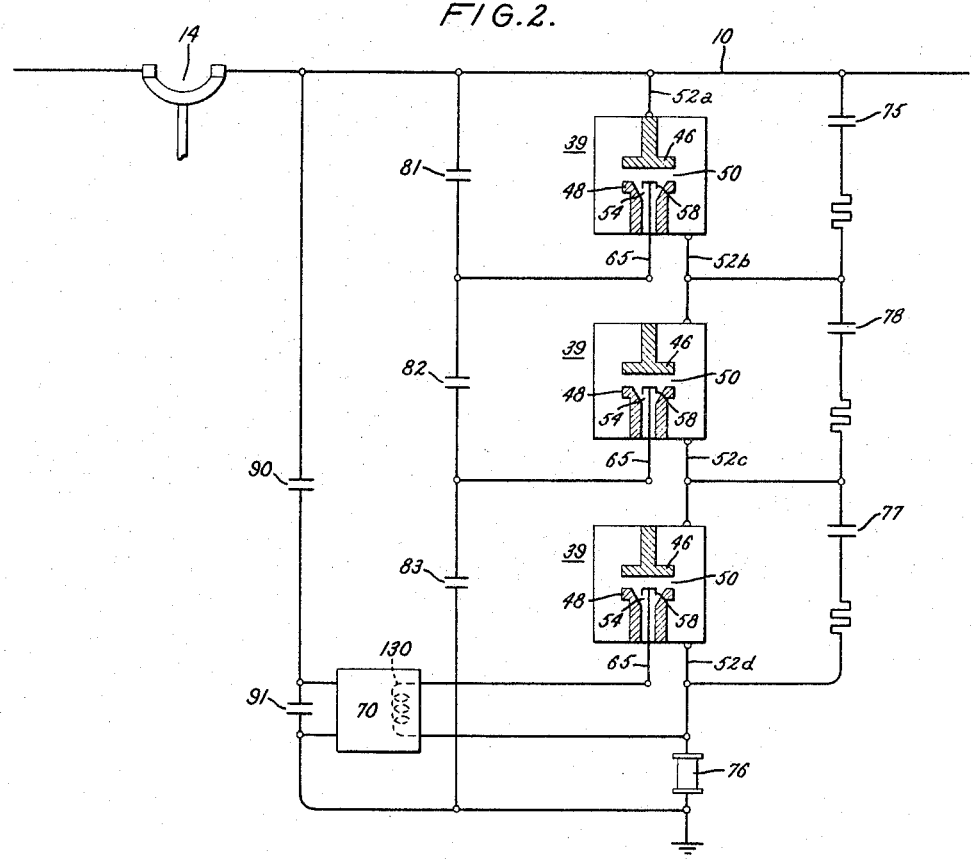
FIG. 2 is a schematic showing of a modified protective arrangement embodying another form of our invention. The protective arrangement of FIG. 2 comprises a plurality of triggered vacuum gap devices as contrasted to the single triggered vacuum gap device of FIG. 1.

A protective arrangement comprising a series of three of these gap devices is schematically illustrated in FIG. 2. Each of the gap devices of FIG. 2 is substantially the same as the gap device 39 of FIG. 1, and thus corresponding parts of these gap devices have been assigned the same reference numerals as is the case with the gap device of FIG. 1. These gap devices 39 of FIG. 2 are shown connected in series with each other in a bypass circuit 52a, 52b, 52c, 52d that extends from the line 10 to ground at the line terminal side of the circuit breaker 14.

Connected between the high voltage line 10 and ground are three voltage-dividing capacitors 75, 78 and 77 that determine the manner in which the line-to-ground voltage will be distributed between the main gaps 50 of the gap devices. The circuit portion 52b between the upper and middle gap devices 39 is connected to the connector between the capacitors 75 and 78; and the circuit portion 52c between the middle and lower gap devices 39 is connected to the connector between the middle capacitor 78 and the lower capacitor 77. Preferably, the capacitors 75, 78 and 77 are of such values that the line-to-ground voltage is equally distributed between the three gap devices 39.

For determining the voltage levels of the trigger electrode 58, three voltage-dividing capacitors 81, 82, and 83 are connected in series-circuit relationship between the line 10 and ground. The junction between capacitors 81 and 82 is connected through lead 65 to the trigger electrode 58 of the upper gap device 39; the junction between capacitors 82 and 83 is similarly connected to the trigger electrode 58 of the middle gap device 39; and the lower terminal of capacitor 83 is connected to the trigger electrode 65 of the lower gap device 39 through elements 76 and 130. These capacitors 81, 82, and 83 are of such values that no substantial voltage normally is present across the trigger gap 54 of each vacuum gap device 39. Accordingly, the trigger gaps 54 are normally substantially unstressed and the main gaps 50 are therefore able to easily withstand normal line-to-ground peak voltages.

When the line-to-ground voltage exceeds a predetermined maximum value in the range of 1.5 to 2 times normal peak voltage, sparkover of the trigger gap 54 of the lower gap device 39 is produced by a voltage-responsive triggering circuit 70 corresponding to the triggering circuit 70 of FIG. 1. This triggering circuit 10 is connected across one of the two voltage-dividing capacitors 90 and 91, which correspond to similarly designated capacitors in FIG. 1. Sparkover of the trigger gap 54 of the lower gap device 39 quickly initiates a sparkover of the main gap 50 of this gap device in the manner described hereinabove.

When the main gap of the lower gap device 39 sparks over, the capacitor 77 connected thereacross quickly discharges through the gap device, thereby sharply reducing the voltage of circuit portion 52c and the lower main electrode 48 of the middle gap device 39. But the trigger electrode 65 of the middle gap device is still at a relatively high voltage due to the continued effectiveness of voltage dividing capacitor 83. Thus, the sharp drop in voltage of the main electrode 48 of the middle gap device produces a large voltage difference across the trigger gap 54 of the middle gap device, thereby sparking over this trigger gap 54 and then the main gap 50 of the middle gap device. Substantially this same sequence of events then repeats itself with respect to the upper gap device. More specifically, when the middle gap device 39 sparks over, the capacitor 78, connected thereacross, quickly discharges therethrough, thus sharply reducing the voltage of the lower electrode 48 of the upper gap device. This sharply increases the voltage difference between this main electrode 48 and its adjacent trigger electrode 58, thus producing a sparkover of the trigger gap 54 of the upper gap device, followed by a sparkover of the main gap 50 of the upper gap device.

This entire sequence of events takes place in an extremely short period of time so that the lower gap device is still arcing when the upper gap device sparks over. Sparkover of the upper gap device will therefore result in completion of the bypass circuit 52a, 52b, 52c, 52d through the gap devices 39 and the non-linear resistor 76; and the energy of the surge will be dissipated through this completed bypass circuit. As previously pointed out, when a current zero point is reached, the gap devices quickly recover their dielectric strength and prevent the further flow of current, assuming that the voltage on line 10 does not again rise to at least the original voltage that produced sparkover of the gap devices.

Although three gap devices 39 have been shown connected in series in the bypass circuit of FIG. 2, it is to be understood that more of these gap devices can be connected in this circuit depending upon the operating voltage of the power line 10. Power circuits for which this invention is especially suited have rated operating voltages of 500 to 1000 kv.

In the aforementioned application S.N. 221,152—Wilson, it is pointed out that immediately after a gas or liquid circuit breaker interrupts a high current, there is a brief period during which the dielectric strength inside the breaker is very materially reduced from its normal or static value. This reduced dielectric strength results from the large volume of hot gases produced within the circuit breaker by the electric arcs accompanying circuit interruption.

A relatively long period is required to remove or at least cool these gases and until this is done, the dielectric strength is reduced. The length of this period of reduced dielectric strength varies directly with the magnitude of the current interrupted and may be as long as several seconds.

This reduced dielectric strength makes the circuit breaker susceptible to electric breakdowns during this period immediately following interruption; and it is most important that any such breakdown that does occur not result in the establishment of a power fault inside the breaker. An example of such a power fault internal to the circuit breaker would be a breakdown across the open contacts 22 or 24 along a path extending electrically between the terminals of the circuit breaker. If the breaker-opening operation had been to clear a fault to ground on the line 10, then such a breakdown across the open contacts would reestablish the electrical connection between the power source 12 and the fault on line 10 and would permit power follow current of high magnitude to flow over this path. If such power follow current commenced within one-half cycle after the first interruption was completed, the circuit breaker would ordinarily still be in a condition to interrupt it. But if this power follow current commenced later than about one-half cycle after interruption had been completed, there would be a significant likelihood that the circuit breaker would not be able to interrupt it. Thus, it is most important to prevent such an internal power fault, especially during the portion of the reduced dielectric strength period beginning about one-half cycle after interruption is completed.

We can protect the circuit breaker from the occurrence of such an internally-located power fault by reducing to a suitably low value the effective sparkover voltage of the gap device or devices 39 during the period of reduced dielectric strength. With the effective sparkover voltage so reduced, any impulse voltages reaching the line terminal of the circuit breaker that are high enough to sparkover the gap device 39 will be limited by such sparkover to values which will be insufficient to cause an electrical breakdown internally of the circuit breaker between its line terminal and its bus terminal.

Our gap device lends itself exceptianally well to such a reduction in its effective sparkover voltage because such reduction can be effected quickly and precisely without moving massive parts or performing other involved steps. More specifically, we accomplish such reduction by relying upon a slightly modified form of the triggering circuit 70 explained hereinabove.

This modified triggering circuit 70 is depicted in FIG. 3. It is substantially the same as the triggering circuit 70 of FIG. 1 except that an additional resistor 99 is connected between the resistors 98 and 100 in the triggering circuit of FIG. 1. This additional resistor 99 is normally shorted out by a normally-closed control switch 140. The position of this control switch 140 is controlled in a conventional manner by the position of the circuit breaker contacts. When the circuit breaker 14 is closed, the switch 140 is in its closed position shown, but when the circuit breaker opens the switch 140 opens. Opening of the control switch 140 removes the short circuit from around the resistor 99, thereby connecting this resistor 99 in series with resistors 98 and 100 and connecting the capacitor 102 across the series combination of resistors 99 and 100. With this resistor 99 in circuit, a larger percentage of the unidirectional voltage appearing across the terminals 95 and 96 will appear across the capacitor 102 than appeared without the resistor 99. Accordingly, with the resistor 99 connected in the circuit, a smaller voltage on the power line 10 will develop a voltage across capacitor 102 sufficient to fire the level detector 110 and hence the triggered vacuum gap device 39. Thus, the opening of control switch 140 produces an effective reduction in the sparkover voltage of the triggered vacuum gap device 39. The value of the resistor 99 is so selected that the effective sparkover voltage of the gap device is reduced to such a value that any impulse voltages reaching the line terminal of the circuit breaker during its reduced dielectric strength period that are high enough to sparkover the gap device 39 will be limited by such sparkover to values which will be insufficient to cause an electric breakdown internally of the circuit breaker between its line terminal and its bus terminal.

The control switch 140 is constructed in a conventional manner so that the circuit breaker opening operation causes it to open, as by a cam 139 on a movable circuit breaker part engaging an operator 141 on the control switch 140. If the circuit breaker remains opens, the cam 139 will move past the control switch operator 141, as shown in dotted lines in FIG. 3, and a reset spring 142 will return the control switch to its closed position after a predetermined time delay. The duration of this time delay, which will normally be a few seconds, is determined by a conventional time delay device such as the dashpot depicted at 144. So long as the control switch 140 is open and the circuit breaker 14 is open, the resistor 99 will be effectively connected in the control circuit and the triggered vacuum gap device 39 will thus have a reduced effective sparkover voltage. When the control switch 140 recloses after its preselected time delay, the resistor 99 will again be shorted out and the effective sparkover voltage of the gap device will be restored to its original and higher value.

Should the circuit breaker be quckly reclosed after an opening operation, it would be desirable to immediately restore the effective sparkover voltage of the gap device 39 to its original value. This can be done by relying upon an auxiliary switch 148 connected in parallel with control switch 140. This auxiliary switch is a conventional "a" switch, which closes when the circuit breaker closes and opens when the circuit breaker is opened. In the event of a rapid reclosing of the circuit breaker, the auxiliary switch 148 closes, thus effectively removing resistor 39 from the electric circuit and restoring the effective sparkover voltage of the vacuum gap device 39 to its original value.

The time delay introduced by dashpot 144 is of such a length that the reduction in the effective sparkover voltage of the gap device is maintained for a predetermined period of substantially the same length of time as the dielectric strength inside the circuit breaker would be significantly reduced by the highest currents that the breaker would be called upon to interrupt.

Since low current interruptions by the circuit breaker do not produce substantial reductions in dielectric strength, no particularly useful purpose is served by reducing the effective sparkover voltage of the gap device after such interruptions. As an additional refinement of the control circuit of FIG. 3, we can prevent the above-described reduction in effective sparkover voltage after a low current interruption by providing an overcurrent relay 160 with normally-closed contacts 162 connected in a circuit 163 paralleling the control switch 140. This relay 160 is connected across the terminals of a suitable current transformer 164 to make it sensitive to the magnitude of line current in line 10. In the event of a heavy current interruption by circuit breaker 14, the relay 160 will open contacts 162 and the rest of the circuit will perform as previously described. In the event the current interrupted by the circuit breaker does not reach a predetermined value, the contact 162 of the overcurrent relay 160 will remain closed and prevent the control switch 140 from introducing the resistor 99, thus preventing a reduction in the effective sparkover voltage of the gap device 39 for a low current interruption. If this latter refinement is not desired, then the overcurrent relay 160 and circuit 163 can be omitted. The overcurrent relay 160 includes a time-delay device 164 that prevents it from closing after an opening operation before the control switch 140 closes.

Although FIG. 3 shows the triggering circuit 70 applied to a protective arrangement that includes only one gap device 39, it will be apparent that it is applicable to an arrangement such as shown in FIG. 2 containing a plurality of series-connected gap devices.

Figure 4:
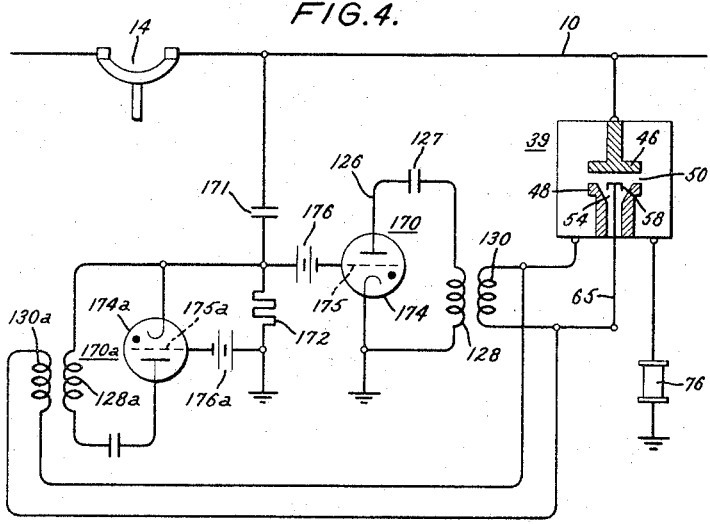
FIG. 4 is a schematic showing of another modified form of our invention.

FIG. 4 schematically illustrates another embodiment of our invention. In this embodiment, sparkover of the gap device 39 is produced in response to switching surges on the line 10 regardless of their magnitude. For effecting this type of control, we provide a triggering circuit 170 which is responsive to rate of change of voltage E on the line 10, i.e., $dE/dt$.

The input signal for the triggering circuit 170 is derived from a circuit comprising the series combination of a capacitor 171 and a resistor 172 connected between the line 10 and ground. The voltage $e$ developed across resistor 172 is directly proportional to rate of change of voltage on line 10, and hence this voltage is used for controlling the triggering circuit 170. This voltage $e$ is applied to the control 175 grid of a thyratron 174, which grid is suitably biased by biasing means schematically shown at 176. When the voltage $e$ exceeds a predetermined value, the voltage on the control grid 175 is high enough to fire the thyratron. When this occurs, a precharged capacitor 127 discharges through a circuit 126, sending through the pulse transformer 128, 130 a high voltage pulse which is applied to the trigger gap 54, all in the same general manner as described in connection with the correspondingly designated parts of FIG. 1. This produce a sparkover of the trigger gap 54 and a resulting sparkover of the main gap, as described hereinabove.

For producing sparkover of the trigger gap 54 in response to a predetermined voltage of opposite polarity across the resistor 172, a second triggering circuit 170a is provided. This circuit 170a is substantially the same as the first triggering circuit 170, but its thyratron 174a has its control grid 175a connected to the lower terminal of the resistor 172 and its cathode connected to the upper terminal of the resistor 172 instead of reversely, as with the other thyratron 174. Corresponding parts in the circuits 170 and 170a have been assigned the same reference numerals, but the suffix "a" has been added to the parts of circuit 170a. When the thyratron 174a sparks over in response to a predetermined voltage across resistor 172, it completes a capacitor discharge circuit 126a, thereby sending a high voltage pulse through the pulse transformer 128, 130a and applying this pulse to the trigger gap 54. As previously explained, this produces a sparkover of the trigger gap 54 and a resulting sparkover of the main gap 50.

A typical switching surge causes the voltage on the power line 10 to change at a rate of about 30 times the maximum rate of change with steady-state 60 cycle voltage. Accordingly, a switching surge will produce a much higher voltage $e$ across the resistor 172 than appears thereacross under normal steady state conditions. The thyratrons 174 and 174a are set to fire in response to voltages $e$ considerably higher than the maximum developed by normal steady-state voltage but substantially lower than that developed by a typical switching surge. Accordingly, the thyratrons do not operate in response to normal steady state voltage but do operate in response to substantially all switching surges regardless of their magnitude, thus producing sparkover of the gap device 39 in response to substantially all switching surges. The advantage of this type of sensitivity will be apparent from the following.

It can be shown that even if the voltage developed at the end of a power line by a switching surge is limited to some definite value by a protective gap device, a higher voltage will appear on the line at a point spaced from the gap device. This higher voltage is due to the wave reflected from the end of the line being superimposed on the forward traveling wave. This forward traveling wave may be considered to be the incoming wave insofar as the gap device is concerned. In the zone of the power system shown in the drawings, this incoming wave would travel from the right to the left on power line 10. The peak voltage developed by this superpositioning of reflected wave on incoming wave can be shown to be equal to:

$$E_t + \frac{E_p}{2}$$

where $E_f$ is the crest value of the incoming wave, and $E_p$ is the sparkover voltage of the gap device.

As one way of accommodating this condition, the triggering circuits of FIGS. 1 and 3 can be adjusted to cause sparkover of their associated gap devices 39 at an appropriately low level to hold the peak voltage developed to the range of 1.5 to 2 times the normal peak voltage. For example, assume the maximum probable value of the typical incoming wave generated by closing a circuit breaker on to the transmission line 10 is 1.2 times normal peak voltage. Assuming no gap device is present, a voltage of twice this value would result when the wave doubled by reflection upon reaching the end of the line. But if a gap device is present and is set to spark-over at say 1.6 times normal peak voltage, then the maximum voltage developed on the line will be $$1.2 + \frac{1.6}{2}$$

or 2 times normal peak voltage.

By using the form of our invention shown in FIG. 4, we can limit the maximum voltage developed to values only slightly greater than $E_f$, the maximum value of the incoming wave. In this connection, as explained above, the protective arrangement of FIG. 4 sparks over in response to substantially all switching surges regardless of their magnitude. As soon as the triggering circuit 170 or 170a senses that the voltage E on the line 10 is changing at a rate indicative of a switching surge being present, it produces sparkover of the vacuum gap device 39. Even for switching surges that produce a peak voltage less than the normal line-to-ground peak voltage, the trigger circuit 170 or 170a will produce a sparkover of the gap device 39. No sparkover of the gap device will, however, be produced in response to normal steady-state voltage, as was described hereinabove.

Figure 5:
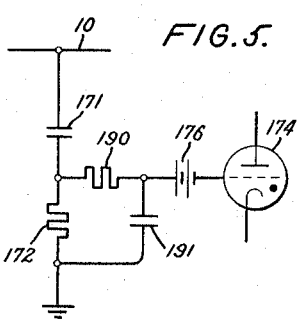
FIG. 5 illustrates a modification of the circuit of FIG. 4.

To desensitize the triggering circuits 170 and 170a to low magnitude surges on the line 10, e.g., surges of less than about .2 times normal peak line-to-ground voltage, the series combination of a suitable resistor 190 and capacitor 191 can be connected across the resistor 172 of FIG. 4, as is illustrated in FIG. 5. By way of example, if the resistor 172 has a value of 5 ohms; the resistor 190 may have a value of 500 ohms; and the capacitor 191, a value of .02 microfarad. The junction between resistor 190 and capacitor 191 is connected to the control grid of the thyratron 144. The presence of this shunting circuit 190, 191 prevents these low magnitude surges from building up a high enough voltage on the thyratron grid to fire the thyratron 174. Thus, with the desensitizing circuit 190, 191 of FIG. 5 present, the gap device 39 does not spark over in response to these low magnitude surges.

Although in the various illustrated embodiments we have shown our protective gap devices 39 connected between the line terminal of a circuit breaker and ground, it should be understood that they can also be connected between the line terminal of a transformer or other high voltage apparatus and ground to protect such apparatus against switching surges and other overvoltages appearing on the line 10.

While we have shown and described particular embodiments of our invention, it will be obvious to those skilled in the art that various changes and modifications may be made without departing from the invention in its broader aspects, and we, therefore, intend in the appended claims to cover all such changes and modifications as fall within the true spirit and scope of our invention.

What we claim as new and desire to secure by Letters Patent of the United States is:

1. In combination with an electric circuit breaker having a bus terminal and a line terminal,
    (a) a triggered vacuum gap device comprising:
        (i) a highly evacuated envelope evacuated to a pressure of $10^{-5}$ mm. of mercury or less,
        (ii) a pair of spaced-apart main electrodes within said evacuated envelope defining a main vacuum gap therebetween, and
        (iii) means including a trigger gap within said evacuated envelope for injecting a concentration of charged conduction carriers into said main gap in response to sparkover of said trigger gap to produce a sparkover between said main electrodes,
    (b) means for electrically connecting said main electrodes in a bypass circuit extending electrically between said line terminal and ground,
    (c) and triggering means responsive to switching surges for producing a sparkover of said trigger gap and a resultant sparkover between said main electrodes when the voltage that is produced by a switching surge between said line terminal and ground reaches a predetermined value in the range of 1.5 to 2 times the normal line-to-ground peak voltage,
    (d) said triggering means comprising a voltage-dividing circuit comprising series-connected impedances connected between said line terminal and ground and means sensitive to the voltage across one of said impedances for applying a voltage pulse to said trigger gap to produce sparkover thereof when the line-to-ground voltage reaches substantially said predetermined value.

2. The combination of claim 1 in which said means for injecting a concentration of charged conduction carriers comprising:
    (a) an insulating body having a surface along which said trigger gap is located,
    (b) a layer of metal contacting said insulating body at one edge of said triggered gap and constituting a trigger electrode,
    (c) said layer of metal being charged with a quantity of hydrogen gas, a portion of which is evolved and ionized upon breakdown of said trigger gap to form said charged conduction carriers.

3. The apparatus of claim 1 in combination with:
    (a) control means operable to modify the characteristics of said triggering means to reduce the line-to-ground voltage required to produce sparkover of said trigger gap to a value that is sufficiently low that when the circuit breaker is open any impulse voltages reaching said line terminal that are high enough to sparkover said gap device will be limited in voltage by such sparkover to values which, in general, will be insufficient to cause an electric breakdown internally of said circuit breaker between said line terminal and said bus terminal, even during the portion of the reduced dielectric strength period beginning about one-half cycle after the interruption of currents near the maximum rating of said circuit breaker,
    (b) and means responsive to opening of said circuit breaker for causing said control means to effect said reduction in effective sparkover voltage.

4. The apparatus of claim 1 in combination with means responsive to opening of said circuit breaker for modifying the characteristics of said triggering means to reduce the value of line-to-ground voltage needed to produce sparkover of said trigger gap.

5. The apparatus of claim 1 in combination with means responsive to the interruption of a high current by said circuit breaker for modifying the characteristics of said triggering means to reduce the value of line-to-ground voltage needed to produce sparkover of said trigger gap, and means for preventing said reduction in effective sparkover voltage if the current interrupted by said circuit breaker is a low current.

6. The apparatus of claim 1 in combination with means responsive to opening of said circuit breaker for modifying the characteristics of said triggering means to reduce the value of line-to-ground voltage needed to produce sparkover of said trigger gap, and means responsive to a rapid reclosing of said circuit breaker for quickly restoring the effective sparkover voltage of said trigger gap to substantially its initial value when rapid reclosing occurs.

7. In an electric system that includes a circuit breaker having a bus terminal and a line terminal,
    (a) a triggered vacuum gap device comprising:
        (i) a highly evacuated envelope evacuated to a pressure of $10^{-5}$ mm. of mercury or less,
        (ii) a pair of spaced-apart main electrodes within said evacuated envelope defining a main vacuum gap therebetween, and
        (iii) means including a trigger gap within said evacuated envelope for injecting a concentration of charged conduction carriers into said main gap in response to sparkover of said trigger gap to produce a sparkover between said main electrodes,
    (b) means for electrically connecting said main electrodes in a bypass circuit extending electrically between said line terminal and ground,
    (c) and triggering means responsive to switching surges for producing a sparkover of said trigger gap and a resultant sparkover between said main electrodes when a switching surge appears at said line terminal, even a switching surge with a crest value less than 1.5 times normal line-to-ground peak voltage,
    (d) said triggering means comprising a voltage-dividing circuit comprising series-connected impedances connected between said line terminal and ground and means sensitive to the voltage across one of said impedances for applying a voltage pulse to said trigger gap to produce sparkover thereof when said switching surge appears at said line terminal.

8. The apparatus of claim 7 in which said triggering means for producing a sparkover of said trigger gap is operable in response to switching surges with a crest value less than one times normal line-to-ground peak voltage.

9. The apparatus of claim 7 in which said triggering means is sensitive to rate of change of voltage at said line terminal.

10. The apparatus of claim 7 in which said triggering means is sensitive to rate of change of voltage at said line terminal but is ineffective to produce a sparkover of said trigger gap in response to switching surges with a crest value less than about .2 times normal line-to-ground peak voltage.

References Cited
UNITED STATES PATENTS

| | | | |
|---|---|---|---|
| 2,456,986 | 12/1948 | Paluev | 317—41 X |
| 3,087,092 | 4/1963 | Lafferty | 315—330 |

MILTON O. HIRSHFIELD, *Primary Examiner.*

J. D. TRAMMELL, *Assistant Examiner.*